Figure 1:
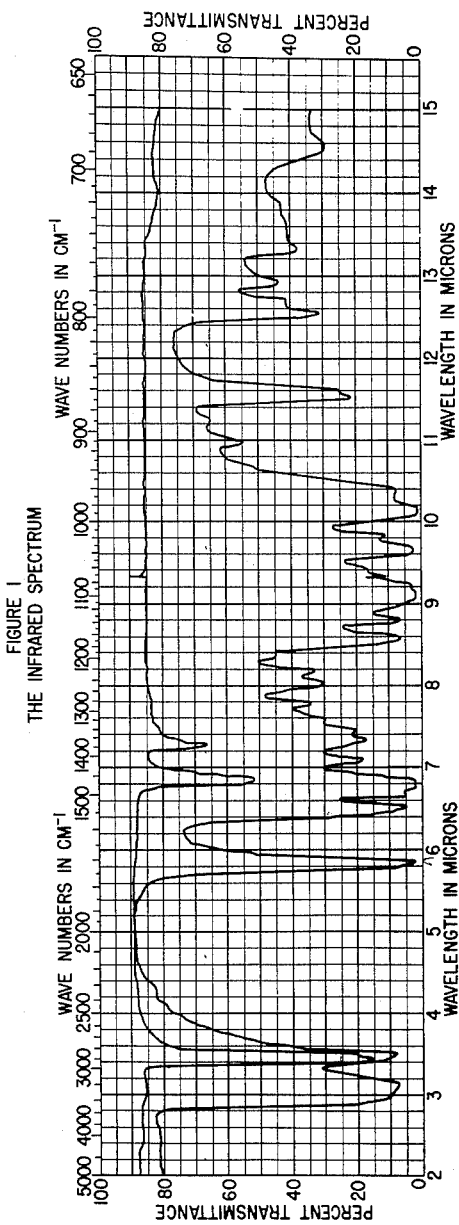

March 27, 1962 M. E. BERGY ETAL 3,027,300
STREPTOZOTOCIN AND ITS PRODUCTON
Filed Aug. 1, 1958 4 Sheets-Sheet 2

THE ULTRAVIOLET SPECTRUM

MALCOLM E. BERGY
CLARENCE DEBOER
ALMA DIETZ
THOMAS E. EBLE
ROSS R. HERR
LEROY E. JOHNSON
*INVENTORS*

BY E.O. RETTER
GEORGE T. JOHANNESEN

*ATTORNEYS*

COMPARATIVE PAPERGRAMS IN DIFFERENT SOLVENT SYSTEMS.

1. 81% n-BUTANOL
2. 81% n-BUTANOL, 0.25% p-TOLUENE SULFONIC ACID
3. 81% n-BUTANOL, ACETIC ACID, WATER (2:1:1)
4. 81% n-BUTANOL, 2% PIPERIDINE
5. 96% WATER, 4% n-BUTANOL
6. 96% WATER, 4% n-BUTANOL, 0.25% p-TOLUENE SULFONIC ACID

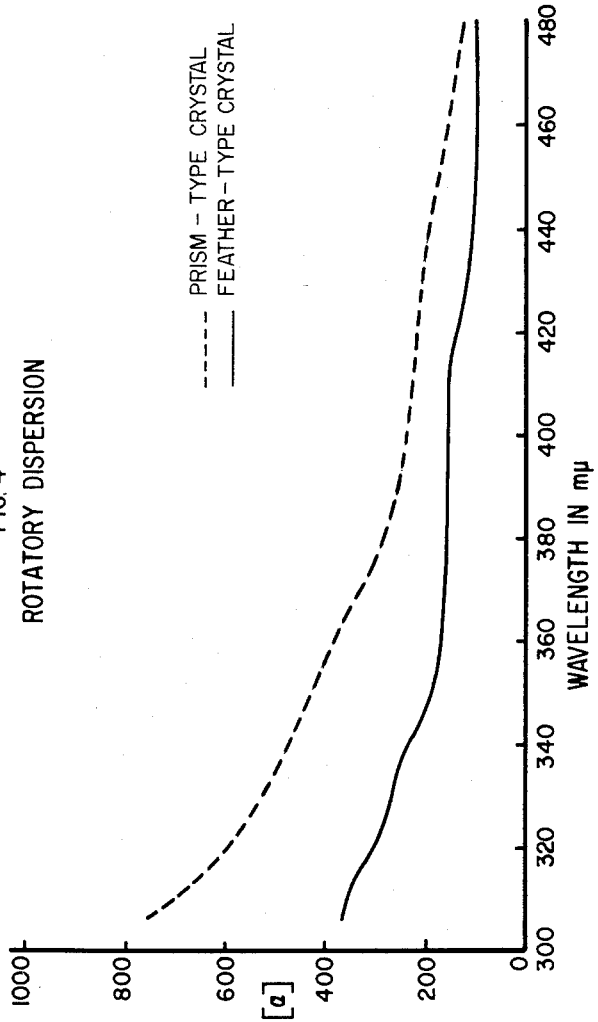

3,027,300
STREPTOZOTOCIN AND ITS PRODUCTION

Malcolm E. Bergy, Kalamazoo, Clarence De Boer, Kalamazoo Township, Kalamazoo County, and Alma Dietz, Thomas E. Eble, and Ross R. Herr, Kalamazoo, and Le Roy E. Johnson, Kalamazoo Township, Kalamazoo County, Mich., assignors to The Upjohn Company, Kalamazoo, Mich., a corporation of Michigan
Filed Aug. 1, 1958, Ser. No. 752,628
9 Claims. (Cl. 167—65)

This invention relates to a composition of matter and to the process for the production thereof. More particularly this invention relates to a new compound, streptozotocin, and to the process for its production.

The new compound of this invention is an elaboration product of *Streptomyces achromogenes* variant *streptozoticus* having the property of adversely affecting growth of various organisms, particularly bacteria. It is distinguished from known antibacterial agents or antibiotics by its characteristic IR and UV spectra, shown respectively in FIGURES 1 and 2, by the typical papergrams, shown in FIGURE 3, by its antibacterial activity against Staphylococcus and Proteus organisms, by its lack of antibacterial activity against *Sarcina lutea*, and by lack of cross-resistance with known antibiotics, among which tested were celesticetin, neamine, neomycin B, neomycin C, erythromycin, tetracycline, penicillin, novobiocin, streptomycin, streptothricin, chloramphenicol, polymyxin, kanamycin, and carbomycin.

*Streptomyces achromogenes* var. *streptozoticus* is a new variety of a known actinomycete which has been isolated from a soil sample taken at Blue Rapids, Kansas, from an uncultivated sandy soil in a grassland region.

A culture of the living organism, herein identified as *Streptomyces achromogenes* var. *streptozoticus*, has been deposited with the Fermentation Division, Northern Utilization Research Branch, U.S. Department of Agriculture, Peoria, Illinois, and has been added to its permanent collection as NRRL 2697.

This new variety of microorganism is distinctly characterized by the production of a brown pigment when grown in most media, and by the sporophores being mostly straight, some having open loops. It appears to be a variant of *Streptomyces achromogenes* Waksman 3730. The latter organism, however, does not produce streptozotocin.

The utilization of carbon compounds by variants of *Streptomyces achromogenes* var. *streptozoticus* in a synthetic medium is shown below in Table I. The procedure of Pridham and Gottlieb, J. Bact. 56, 107–114 (1948), was used with the following modifications:

(1) A 500-milliliter Erlenmeyer flask containing 100-milliliters sterile tryptone-yeast extract broth was inoculated from a soil stock of *Streptomyces achromogenes* var. *streptozoticus*. The flask was incubated at 28 degrees centigrade, on a reciprocal shaker.

(2) After 48 hours, the supernatant was decanted. The vegetative growth was washed with 100 milliliters of sterile, distilled water and the supernatant was again decanted. 100 milliliters of sterile distilled water was then added to the washed vegetative growth. The flask containing the mixture was placed on a reciprocal shaker and incubated at 28 degrees centigrade.

(3) After an additional 48 hours, the supernatant was decanted. The vegetative growth was washed as described above and blended for one minute in 100 milliliters of sterile, distilled water.

(4) The agar slants were seeded with 0.2 milliliter of the blended inoculum.

TABLE I

*Assimilation of Carbon Compounds in Synthetic Medium*
*J. Bact., 56, 107–114 (1948)*

|  | Streptomyces achromogenes | |
|---|---|---|
|  | var. streptozoticus | Waksman No. 3730 |
| Control | − | (−) |
| 1. d-xylose | + | + |
| 2. l-arabinose | + | + |
| 3. rhamnose | + | + |
| 4. d-fructose | + | + |
| 5. d-galactose | + | + |
| 6. d-glucose | + | + |
| 7. d-mannose | + | + |
| 8. maltose | + | + |
| 9. sucrose | (−) | (−) |
| 10. lactose | + | + |
| 11. cellobiose | (+) | + |
| 12. raffinose | (−) | (−) |
| 13. dextrin | (+) | + |
| 14. inulin | (−) | (−) |
| 15. soluble starch | (+) | + |
| 16. glycerol | + | + |
| 17. dulcitol | (−) | (−) |
| 18. d-mannitol | + | + |
| 19. d-sorbitol | (+) | (+) |
| 20. dl-inositol | (−) | (−) |
| 21. salicin | (+) | + |
| 22. phenol | − | − |
| 23. cresol | − | − |
| 24. Na formate | − | (−) |
| 25. Na oxalate | − | − |
| 26. Na tartrate | − | (−) |
| 27. Na salicylate | − | − |
| 28. Na acetate | + | + |
| 29. Na citrate | (+) | + |
| 30. Na succinate | + | + |
| All cases | Pink to gray aerial growth | |

+ positive assimilation; − negative assimilation; (−) slight growth, no assimilation; (+) positive assimilation, only slight growth.

Table II shows the macroscopic appearance of *Streptomyces achromogenes* var. *streptozoticus* on various cultures in slanted tubes as viewed from the surface and from the underside (reverse). Certain characteristics common with *Streptomyces achromogenes* Waksman 3730 are shown in Table II.

TABLE II

*Macroscopic Appearance, Ecktachrome Slides*

| Medium | Streptomyces achromogenes | | | |
|---|---|---|---|---|
|  | Variant *streptozoticus* | | Waksman's No. 3730 | |
|  | Surface | Reverse | Surface | Reverse |
| Bennett's | Gray | Brown | Gray | Brown. |
| Czapek's sucrose | do | Tan | do | Tan. |
| Maltose tryptone | Gray-white | Brown | Gray-white | Brown. |
| Peptone iron | No aerial growth | do | No aerial growth | Do. |
| 0.1% Tyrosine | Gray-white | do | Gray | Do. |
| Casein starch | Gray | do | do | Do. |

*Streptomyces achromogenes* var. *streptozoticus* exhibits distinctive growth and morphological characteristics, as shown below in Table III, when grown on the following media. The ingredients of the media are in grams per liter of distilled water, media are autoclaved for fifteen minutes at a pressure of fifteen pounds per square inch gauge at 121 degrees centigrade.

Casein starch agar: Sodium caseinate 2.0, soluble starch 1.0, $K_2HPO_4$ 0.2, $MgSO_4 \cdot 7H_2O$ 0.2, $FeSO_4 \cdot 7H_2O$ trace, agar 15.0.

Czapek's sucrose agar: $NaNo_3$ 2.0, $K_2HPO_4$ 1.0, $MgSO_4 \cdot 7H_2O$ 0.5, KCl 0.5, $FeSO_4 \cdot 7H_2O$ 0.01, sucrose 30.0, adjusted to a pH of 6.6, agar 15.0.

Maltose tryptone agar: Maltose 10.0, tryptone 5.0, $K_2HPO_4$ 0.5, NaCl 0.5, $FeSO_4 \cdot 7H_2O$ trace, agar 15.0. (Tryptone is a pancreatic digest of casein of high tryptophane content.)

Bennett's agar: Yeast extract 1.0, beef extract 1.0, N-Z amine A (enzymatic digest of casein) 2.0, glucose 10.0, medium adjusted to pH 7.0, agar 15.0.

Nutrient starch agar: Beef extract 3.0, peptone (hydrolyzate of animal protein of low molecular weight) 5.0, soluble starch 2.0, medium adjusted to pH 7.0, agar 15.0.

Peptone iron agar: Peptone 15.0, proteose peptone (hydrolyzate of animal protein of high molecular weight) 5.0, ferric ammonium citrate 0.5, dipotassium phosphate 1.0, sodium thiosulfate 0.08, agar 15.0.

Glucose asparagine agar: Glucose 10, asparagine 0.5, $K_2HPO_4$ 0.5, agar 15. pH 6.8.

Plain gelatin: Gelatin 120.

Nutrient gelatin: Beef extract 3.0, peptone 5.0, gelatin 120, adjusted to pH 7.0.

Tryptone broth: Tryptone 1.0, adjusted to pH 7.0.

Litmus milk: Dehydrated milk with litmus dye added.

Nutrient nitrogen broth: Beef extract 3.0, peptone 5.0, $KNO_3$ 1.0.

Synthetic nitrogen broth: $K_2HOP_4$ 0.5, NaCl 0.5, $MgSO_4 \cdot 7H_2O$ 0.2, $NaNO_3$ 2.0, glucose 10.0.

Calcium malate agar: Calcium malate 10.0, $NH_4Cl$ 0.5, $K_2HPO_4$ 0.5, adjust medium to pH 7.0, agar 18.0.

Tyrosine agar: Tyrosine 1.0, agar 15.0.

TABLE III

*Characteristic Growth in Various Media, as Read After Seven Days*

| | Streptomyces achromogenes | |
|---|---|---|
| | Variant *streptozoticus* | Waksman 3730 |
| Plain gelatin | Gray aerial growth, brown pigment, trace liquefaction. | Gray aerial growth, brown pigment, no liquefaction. |
| Nutrient gelatin. | No aerial growth, brown pigment, trace liquefaction. | White aerial growth, brown pigment, no liquefaction. |
| Nutrietn nitrogen broth. | Gray-white aerial growth on surface pellicle, yellow-tan pigment, reduction negative.[1] | Gray-white aerial growth on surface pellicle, yellow-tan pigment, reduction negative. |
| Synthetic nitrogen broth. | Vegetative growth-pellicle at surface and flocculent throughout, trace gray-white aerial growth, trace yellow pigment, reduction negative.[1] | Vegetative growth-pellicle at surface and flocculent throughout, trace gray-white aerial growth, strong yellow pigment, reduction negative. |
| Tryptone broth. | Trace gray-white aerial growth on surface colonies, brown-tan pigment. | Trace gray-white aerial growth on surface colonies, brown-tan pigment. |
| Litmus milk | No change. | No change. |
| Tyrosine agar | Gray aerial growth, gray reverse, brown pigment. | Gray aerial growth, gray reverse, pink-tan pigment. |
| Peptone iron agar. | Colorless vegetative growth, $H_2S$ darkening. | Colorless vegetative growth, $H_2S$ darkening. |
| Calcium malate agar. | Gray aerial growth, gray reverse. | Gray-white aerial growth, gray-white reverse. |
| Glucose asparagine agar. | Gray-white aerial growth, cream reverse, yellow pigment. | Gray-white aerial growth, cream reverse, yellow pigment. |
| Maltose-tryptone agar. | Gray-blue aerial growth, brown reverse, brown pigment. | Gray-blue aerial growth, brown reverse, brown pigment. |
| Bennett's agar 18° C. | Hair gray-pink aerial growth tinged with green, tan reverse, tan pigment. | Fair gray-pink cream aerial growth, tan reverse, tan pigment. |
| Bennett's agar 24° C. | Fair gray-white aerial growth, tan reverse, tan pigment. | Fair gray-white aerial growth, tan reverse, tan pigment. |
| Bennett's agar 28° C. | Gray-pink aerial growth, tan reverse, tan pigment. | Gray-pink aerial growth, tan reverse, tan pigment. |
| Bennett's agar 37° C. | Good gray-blue tan aerial growth, brown tan reverse, brown tan pigment. | Good gray-blue tan aerial growth, brown tan reverse, brown tan pigment. |
| Bennett's agar 55° C. | No growth | No growth. |
| Czapek's sucrose agar 18° C. | Trace gray aerial growth, gray reverse. | Trace gray aerial growth, gray reverse. |
| Czapek's sucrose agar 24° C. | Fair gray aerial growth, gray reverse. | Fair gray aerial growth, gray reverse. |
| Czapek's sucrose agar 28° C. | do | Do. |
| Czapek's sucrose agar 37° C. | Good gray aerial growth, gray reverse. | Good gray aerial growth gray reverse. |
| Czapek's sucrose agar 55° C. | No growth | No growth. |
| Casein starch agar. | Lavender-gray aerial growth, tan reverse, hydrolysis. | Lavender-gray aerial growth, tan reverse, hydrolysis. |
| Nutrient starch agar. | Pink-white aerial growth, cream-tan reverse, hydrolysis. | Pink-white aerial growth, cream-tan reverse, hydrolysis. |

[1] Checked for nitrate reduction at 24 and 48 hours.

All observations after seven days' incubation at 28° unless otherwise noted.

Streptozotocin can be produced by cultivating *Streptomyces achromogenes* var. *streptozoticus* or a variant thereof in an aqueous nutrient medium under submerged aerobic conditions and preferably, in a nutrient medium containing an assimilable carbohydrate and a nitrogen compound or proteinaceous material. Although there are a number of suitable media available, for economy of production, maximum yield and ease of isolation, certain culture media are preferred. The presently preferred sources of carbohydrates are glucose, dextrin, molasses, corn meal (refined and unrefined), and starch (bolted and soluble), including combinations thereof. Other suitable sources are maltose, galactose, mannitol, soybean oil, animal and vegetable oils, and the like. The preferred sources of nitrogen are protein sources such as cotton seed meal, soybean meal, fish meal, defatted soybean meal, peptone, and the like. Other suitable sources are peanut meal, brewer's yeast (dried yeast cells obtained from a beer fermentation), corn gluten meal, corn steep liquor, fish stick liquor, distillers solubles, trypticase, beef extract, N-Z amine A, N-Z amine B, proteolized milk and egg products, and the like. Combinations of two or more of these nitrogen sources can advantageously be used.

Nutrient inorganic salts, for example, salts capable of yielding ions such as potassium, sodium, calcium, phosphate, sulfate, and the like, can be advantageously incorporated in the medium. Essential trace elements such as magnesium, manganese, zinc, cobalt, iron, and the like, can also be included in the culture medium for growing *Streptomyces achromogenes* var. *streptozoticus*. Such trace elements are commonly supplied as impurities incidental to the addition of the constituents of the medium.

The media used in the process of the invention can contain precursors, in addition to the nutrient components present therein, to obtain valuable products. For example, an assimilable source of cobalt can be included where cobalamines (vitamin $B_{12}$ and vitamin $B_{12}$-like products) are desired, and these by-products then recovered by conventional methods. Similarly, steroid precursors, such as progesterone or Reichstein's Compound S or S acetate, can be added to obtain an oxidized steroid.

In a preferred method of fermentation of the microorganism *Streptomyces achromogenes* var. *streptozoticus*, the inoculum is incubated for 48 hours at 28 degrees centigrade and the inoculated fermentor is incubated for about the first 70 hours at 37 degrees centigrade, and then 28 degrees centigrade until the fermented beer is ready to be harvested.

For maximum growth and development of *Streptomyces achromogenes* var. *streptozoticus,* the culture medium, prior to inoculation with the microorganism, should be adjusted to a pH between about 6.5 and about 7.5. Advantageously, the pH is controlled during the fermentation below about pH 5.5 by a slow feeding of glucose.

Submerged, aerobic culture conditions are the conditions of choice for the production of large amounts of streptozotocin. For the preparation of limited amounts shaken flasks and surface cultures in bottles can be employed. When growth is carried out in large vessels and tanks, it is preferable to use the vegetative form of the microorganism for inoculation to avoid a pronounced lag in the production of streptozotocin and the attendant inefficient utilization of the equipment. Accordingly, it is desirable first to produce a vegetative inoculum of the microorganism by inoculating a relatively small amount of culture medium with material scraped from a nutrient agar slant of the microorganism, and when a young, active, vegetative inoculum has been secured, to transfer the vegetative inoculum aseptically to large vessels or tanks. The medium in which the vegetative inoculum is produced can be the same as, or different from, that utilized for the production of streptozotocin.

Optimum yields of streptozotocin are obtained when the culture medium is maintained at a temperature between about 24 and about 37 degrees centigrade, and preferably between about 28 and about 37 degrees centigrade, for a period between about two and seven days.

The rate of production of streptozotocin and the concentration of streptozotocin in the culture medium are readily followed during the growth period of the microorganism by testing samples of the culture medium for antibacterial activity against an organism known to be susceptible to streptozotocin, e.g., *Proteus vulgaris,* by standard agar diffusion or turbidimetric test procedures. In general, maximum production of streptozotocin, after inoculation of the culture medium, occurs between about two and about seven days when submerged aerobic cultures are employed.

Streptozotocin can be removed from the culture medium by extractive or adsorbtive techniques including adsorption on carbon, or like capillary adsorbent, and elution therefrom in a suitable eluting agent. Solvent extraction procedures are preferred for commercial production inasmuch as they are less time consuming and expensive, and higher recovery yields are obtained thereby.

A preferred extraction procedure for recovering streptozotocin from the fermented nutrient medium comprises filtering the fermented beer at a pH between about 2 to 7, and then concentrating the filtered beer to 0.08 volume in vacuo. Inactive material in the concentrate is precipitated by the addition of an organic solvent such as a lower alkanol or alkanone such as methanol, ethanol or acetone. The precipitated material is discarded. The streptozotocin is recovered from the filtrate which is concentrated and then freeze-dried. The freeze-dried preparation is further purified by Craig countercurrent distribution using a solvent system such as 1-butanol and 0.004 normal aqueous hydrochloric acid in the volume proportions of 1:1; 1-butanol and 0.001 normal aqueous hydrochloric acid in the volume proportions 1:1; ethyl acetate and water in the volume proportions of 1:1; benzyl alcohol; and methylethyl ketone and water in the volume proportions of 1:1. In most cases the K value is about 0.22 for the fractions which contain streptozotocin. These fractions are pooled and freeze-dried, dissolved in distilled water and filtered, then extracted with water-saturated 1-butanol. This water extract is distilled to remove the 1-butanol (azeotrope) and the aqueous solution is then freeze-dried to recover a further purified streptozotocin.

The freeze-dried material thus obtained can be further purified by partition chromatography using a solvent system such as 1-butanol, cyclohexane, pH 4 buffered water in the volume proportions 20:4:4; methylethyl ketone and water in the volume proportions 1:1, or the solvent systems mentioned supra and infra for use in the countercurrent distribution method. The eluate of the partition chromatography is concentrated and freeze-dried to yield a purified preparation of streptozotocin which can then be further purified by crystallization from aqueous methylethyl ketone. Crystalline streptozotocin can be further purified by recrystallizing from the same or like lower alkanone or from a lower alkanol such as ethanol.

Figure 3:
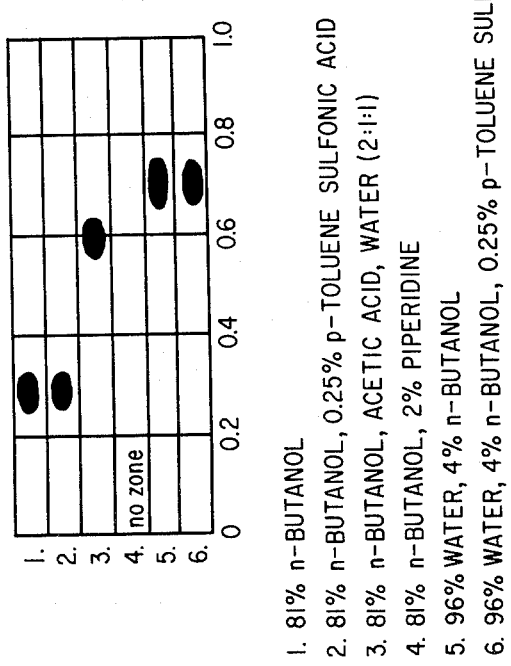

Streptozotocin is characterized by its mobility in paper strip chromatography. A typical papergram series made by using six different solvent systems, is shown in FIGURE 3. The pattern is unique and characterizes streptozotocin as a new antibiotic. The same pattern is obtained from whole beer, filtered beer, an aqueous or solvent concentrate, and crystalline material. The $R_f$ values in the various solvent systems as shown in FIGURE 3 are as follows: Solvent 1 $R_f$ 0.3; solvent 2, $R_f$ 0.3; solvent 3, $R_f$ 0.6; solvent 4, no zone; solvent 5, $R_f$ 0.7; solvent 6, $R_f$ 0.7.

Streptozotocin can also be purified by partition chromatography, using a solvent system such as 1-butanol, cyclohexane, water in the volume proportions 20:4:4. Advantageously the water may be buffered to about pH 4. Another suitable solvent system for partition chromatography is methylethyl ketone, cyclohexane, pH 4 buffered water in the volume proportions 9:1:1.43.

Streptozotocin can be purified by countercurrent distribution using the solvent systems noted in Table IV.

TABLE IV

*Countercurrent Distribution Solvent Systems*

| Solvent | Proportions. | *k* | *K | No. of transfers |
|---|---|---|---|---|
| Benzyl alcohol | 1 | 1.88 | | |
| Methylethyl ketone | 1 | 0.3 | | |
| Water | 1 | | | |
| Ethylacetate | 1 | 0.085 | | |
| Water | 1 | | | |
| 1-butanol | 1 | | 0.235 | 100 |
| Water (0.001 normal HCl) | 1 | | | |
| 1-butanol | 1 | | | |
| Water (0.004 normal HCl) | 1 | | 0.256 | 500 |
| Methylethyl ketone | 1 | | 0.15 | 503 |
| Water | 1 | | | |
| Methylethyl ketone | 1 | | 0.22 | 775 |
| Water | 1 | | | |

*k=partition coefficient from shakeout.
*K=distribution coefficient from transfers of countercurrent distribution.

A pool of the active fractions taken from a countercurrent distribution can be concentrated by azeotropic distillation. Crystals form in the concentrate from which they can be removed by filtration and then vacuum dried. On recrystallization from 95 percent ethanol essentially pure crystalline streptozotocin is recovered. The recrystallized material has the following properties and characteristics:

Melting point: Indefinite, decomposes with evolution of gas at about 115 degrees centigrade, becoming a clear liquid by 125 degrees centigrade.

Elemental analysis: C, 36.30; H, 5.74; N, 15.11; O, 39.90.

Empirical formula: The above analysis corresponds most closely to $C_{14}H_{27}N_5O_{12}$.

Calculated: C, 36.80; H, 5.95; N, 15.30; O, 41.80.
 Found: C, 36.30; H, 5.74; N, 15.11; O, 39.90.

Molecular weight: 481 and 468 (by isothermal distillation).

Figure 2:
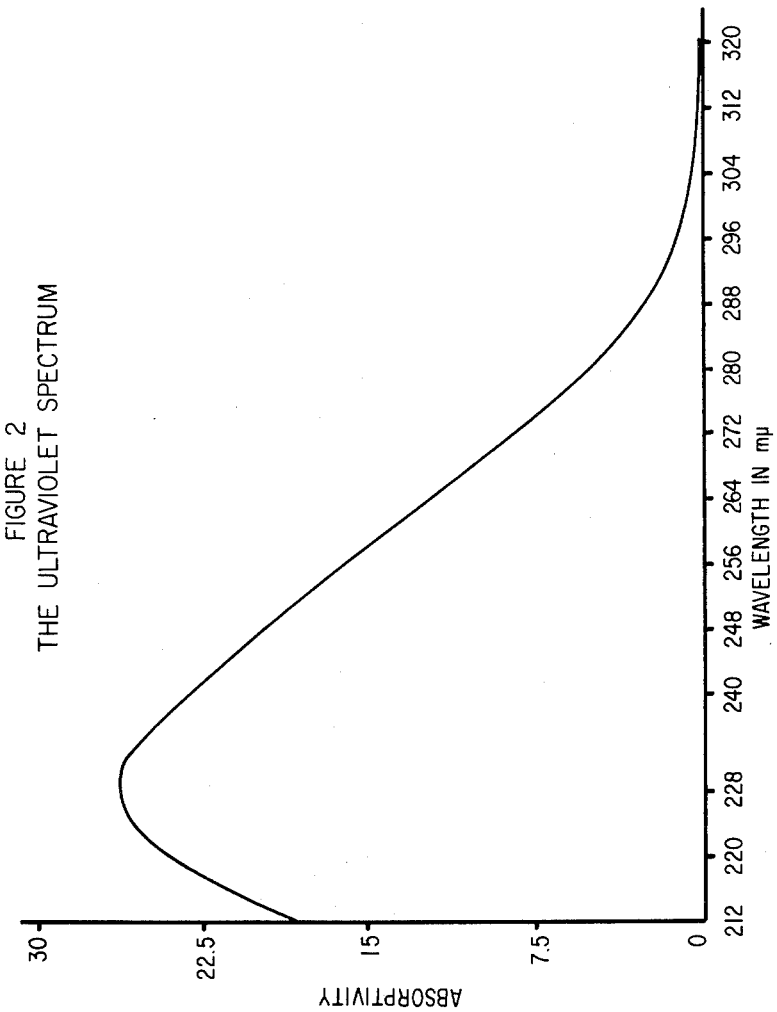

UV spectrum: λ max. 228; a=24 (in ethanol), as shown in FIGURE 2.

IR spectrum: Shows multiple OH/NH, at least one carbonyl, and multiple absorption bands in 1500 cm.$^{-1}$ region, as shown in FIGURE 1. The infrared absorption spectrum (sodium chloride prism) of streptozotocin in a mineral oil suspension exhibits characteristic absorption bands expressed in reciprocal centimeters at the following frequencies:

| Frequency: | Intensity |
|---|---|
| 3600 | W (sh). |
| 3440–3180 | S. |
| 2700 | W (sh). |
| 2580 | W (sh). |
| 1718 | S. |
| 1705 | S. |
| 1670 | M (sh). |
| 1565 | M (sh). |
| 1548 | S. |
| 1535 | S. |
| 1505 | S. |
| 1497 | S. |
| 1483 | S. |
| 1425 | M (sh). |
| 1413 | M. |
| 1368 | M. |
| 1345 | M. |
| 1325 | M. |
| 1310 | W (sh). |
| 1290 | M. |
| 1250 | M. |
| 1225 | M. |
| 1200 | W. |
| 1170 | S. |
| 1137 | S. |
| 115–1083 | S. |
| 1065 | S. |
| 1035 | S. |
| 1020 | S. |
| 985 | S. |
| 968 | S. |
| 910 | W. |
| 889 | W. |
| 818 | S. |
| 810 | M (sh). |
| 793 | S. |
| 780 | M (sh). |
| 770 | M. |
| 745 | M. |
| 730 | M. |

The intensities listed supra have been observed in an instance of testing a crystalline sample of purified streptozotocin.

Titration: Titration of crystalline material showed no basic or acidic groups. The antibiotic is, therefore, neutral.

Stability: Streptozotocin is most stable about pH 4.0, least stable at an alkaline pH.

Alkaline degradation: Treatment of aqueous solutions of streptozotocin with 10 percent NaOH causes evolution of nitrogen.

Spot tests:

| Name | Purpose | Result |
|---|---|---|
| Benedicts | Reducing sugar | Negative. |
| Molisch | Substance which forms furfural. | Questionable. |
| Ninhydrin | Amino acid | Negative. |
| Biuret | Proteins and peptones | Do. |
| Periodate | Adjacent hydroxyls | Do. |
| Fearon-Mitchell | Primary and secondary alcohol. | Do. |
| Liebermann | N-nitroso group | Positive. |
| Anthrone | Sugars to polysaccharide | Do. |

The positive Liebermann N-nitroso test is unique, since none of the known antibiotics show evidence of an N-nitroso group. The evolution of nitrogen in aqueous NaOH is also characteristic of an N-nitroso group.

Crystallography: Two crystal forms have been obtained, both are biologically active, the feather-type and the prism-type. The rotatory dispersion curves of both crystal types are shown in FIGURE 4. The X-ray diffraction patterns of both crystal types show the following points in interplanar spacings, expressed in Angstrom units, $d$, A. (Cu, $k_{\alpha 1}$): 10.64, 9.30, 7.43, 5.98, 5.53, 4.91, 4.58, 3.94, 3.61, 3.35, 3.19, 3.01, 2.45, 2.26, 2.18, 2.12, 2.07. The optical rotation of the two crystal forms are as follows:

|  | Medium | Feather-type | Prism-type |
|---|---|---|---|
| $[\alpha]_D^{25}$ | C, 0.05% Dioxane | +41° ±10 | +68° ±10 |
| $[\alpha]_D^{25}$ | C, 1.0% Ethanol | +68° ±10 | +87° ±10 |

Streptozotocin can be acylated, for example, with acetic anhydride to give the acetate or like lower fatty acid ester or hydrogenated (on hydrogenation streptozotocin takes on about five to six moles of hydrogen), to give the hydrogenated form as active derivatives.

In another extraction procedure for recovering streptozotocin from the fermented nutrient medium the fermented beer is adjusted to a pH between about 2 to 7 and filtered. The filtered beer is adsorbed on activated carbon, bentonite, diatomite, fuller's earth, or the like, and then eluted with an organic solvent such as a lower fatty acid ester, lower alkanone, or lower alkanol, such as ethyl acetate, butyl acetate, ethanol, methylethyl ketone, preferably methanol or acetone, and the like. The streptozotocin is recovered therefrom by crystallization either directly, or after further purification by chromatography or liquid-liquid extraction.

Crystalline streptozotocin, Preparation 4F, shows the following antibacterial activity in vitro in Table V:

All the organisms were inoculated in tubes containing ten milliliters of nutrient broth, with the noted exception, and incubated for one to two hours. At this point the optical density was measured and streptozotocin was added. Final measurements were made after six more hours of incubation and $ID_{50}$ values were calculated.

TABLE V

*Antibacterial Spectrum*

| Organism | $IC_{50}$[2] (mcg./ml.) | End point [3] (mcg./ml.) |
|---|---|---|
| *Salmonella pullorum* [1] | 0.15 | 0.25–1.0 |
| *Proteus vulgaris* | 0.20 | 1.0–2.5 |
| *Salmonella schottmuelleri* | 0.35 | 1.0 |
| *Escherichia coli* | 0.50 | 2.5–5.0 |
| *Staphylococcus aureus* | 0.75 | 5–6 |
| *Salmonella typhi* | 0.90 | 2.5–5.0 |
| *Streptococcus fecalis* | 2.0 | >20 |
| *Klebsiella pneumoniae* | 3.0 | 5–10 |
| *Pasteurella multocida* | <0.25 | <0.25 |
| *Aerobacter aerogenes* | 10.0 | >20 |

[1] Brain heart infusion broth at pH 6.8.
[2] Inhibitory Conc. to 50 percent; will block growth of organisms to one-half of maximum or control.
[3] The same turbidity as after the initial incubation; no growth.

Because of the high activity of streptozotocin against *Pasteurella multocida* and *Salmonella pullorum*, this compound is effective in veterinary use for the treatment of animals infected with bacterial diseases, such as shipping fever in cattle and pullorum in chickens.

Streptozotocin is not only bacteriostatic but bactericidal. For example, with *Proteus vulgaris* 99 percent of the organisms in a suspension were killed in thirty minutes by ten micrograms per milliliter at 37 degrees centigrade.

The acute toxicity of streptozotocin was greater than 160 milligrams per kilogram, as tested in mice.

An example of the in vivo activity of crystalline streptozotocin, Preparation 4F, in mice is shown in Table VI.

TABLE VI

*Crystalline Streptozotocin Activity in Vivo*

| CD$_{50}$* Subcutaneously | P. multocida | S. aureus | P. vulgaris | S. paratyphi |
|---|---|---|---|---|
| Streptozotocin | 0.58 | 3.2 | 2.5 | 18 |
| Novobiocin | 24 | 9 | 35 | >320 |
| Tetracycline | 1.4 | 1.1 | >51 | 20 |
| Chloromycetin | 14 | 73 | 100 | 87 |
| Penicillin | 5 | 1.3 | 57 | 7,100 |

* CD$_{50}$ = the dose at which fifty percent of the infected animals survive, as milligram per kilogram.

Streptozotocin, including derivatives thereof, is useful in combating diseases caused by bacterial infections in animals but its value in human therapy has not yet been established. For this use, the antibiotic is associated with a significant amount of a pharmaceutical carrier which may be either a solid material, a powder, or a liquid. The compositions can take the form of tablets, effervescent tablets, powders, granules, capsules (both hard and soft shell capsules), suspensions in edible oils, aqueous suspensions, or other dosage forms which are particularly useful for oral administration. Liquid diluents are employed in sterile conditions for parenteral use. Such a medium can be a sterile solvent or a sterile suspending vehicle such as an injectable oil or water with or without hydrophilic colloids such as sodium carboxymethylcellulose polyvinyl pyrrolidone, gelatin, alginates, tragacanth, and like suspending and/or dispersing agents. The compositions can take the form of active material, namely, the antibiotic, admixed with solid diluents and/or tableting adjuvants such as corn starch, lactose, talc, stearic acid, magnesium stearate, gums, and the like. Any of the encapsulating or tableting materials used in pharmaceutical practice can be employed where there is no incompatibility with the antibiotic. The materials can be tableted or placed in the usual capsule of absorbable material such as the usual gelatin capsule and administered in that form. Streptozotocin, including derivatives thereof, illustratively the hydrogenated compound or the acetate, can be prepared in the form of a suspension in a suitable fixed oil containing about two percent aluminum monostearate as a suspending agent. Such a suspension can be given orally as made or can be encapsulated. The antibiotic in the form of ointments including petrolatum-type grease base, polyethylene glycol water-soluble bases, creams, and water-oil emulsions and lotions are useful topically. Other useful topical preparations with this antibiotic include ear drops, eye drops, aerosols, nasal sprays, troches, and suppositories. For veterinary use, the antibiotic can be administered in the form of bougies, mastitis ointments, oil suspensions, aqueous solutions and suspensions, and the like.

The percentage of the active ingredient can be varied depending upon the formulation and the mode of intended use. Also a smaller percentage can be used if several unit dosage forms are to be administered at the same time. Although, particularly on intravenous injection, a percentage of less than about 0.10 percent of antibiotic can be used, it is preferable to use not less than about 0.10 percent thereof as the effectiveness of the antibiotic increases with the amount of the antibiotic administered. Tablets or capsules containing from about fifty to about 500 milligrams of streptozotocin or its derivatives are useful. One or more tablets or capsules can be taken at one time.

Because of its marked bactericidal activity and low toxicity, streptozotocin and its derivatives are useful as therapeutic agents in the treatment of various diseases. Thus, either alone or in combination with sulfa compounds such as sulfadiazine, sulfamerazine, sulfamethazine, sulfacetamide, sulfamethylthiadiazole (in a ratio of about 1 part of the antibiotic to 2 parts of total sulfa), and the like, or with other antibiotics such as tetracycline, oxytetracycline, chlortetracycline, penicillins, novobiocin, neomycin, erythromycin, streptomycin, bacitracin, polymyxin, chloramphenicol, kanamycin, nystatin, or the like, the antibiotic is useful in the treatment of a variety of infections especially those caused by Staphylococcus and Proteus organisms. The antibiotic is likewise useful in combination with the various vitamins such as thiamine, riboflavin, ascorbic acid, niacinamide, pyridoxine, pantothenic acid or pantothenate salts, vitamin $B_{12}$, folic acid, and the like. Other therapeutically useful materials can also be combined with the antibiotic. Streptozotocin and its derivatives are also useful in combination with corticoids, such as cortisone, hydrocortisone, prednisone, and prednisolone, including esters thereof, e.g., the acetate, cyclopentylpropionate, succinate and the sodium salt, and the like; and the fluoro, methyl, and hydroxy analogues of the same, such as 6α-fluorohydrocortisone, 6α-fluoroprednisolone, 16 - hydroxy - 9α - fluorohydrocortisone, 6-methyl-21-desoxy-9α-fluoro-6α-methylprednisolone, and 16-methyl-9α-fluoroprednisolone, and the esters thereof.

Streptozotocin can also be used as a feed supplement in promoting the growth of animals and poultry either alone or in combination with other antibiotics; also as an additive for Pyelographic Media (Journal of Urology 74: 563–566, October 1955).

Streptozotocin is assayed by disk plate assay with *Proteus vulgaris*. Activity has been expressed in terms of *Proteus vulgaris* bio units (P.v. [bio]), i.e., the amount of antibiotic which will give a 20 millimeters zone of inhibition when applied on a 12.7 millimeters paper assay disk on a standard agar plate seeded with *P. vulgaris*. A 0.1 molar phosphate buffer at pH 6.0 is used in making the dilutions.

The following examples are illustrative of the process and products of the present invention, but are not to be construed as limiting. All percentages are by weight and all solvent mixture proportions are as volume by volume unless otherwise noted.

EXAMPLE 1

A soil isolate of *Streptomyces achromogenes* var. *streptozoticus* was streaked on an agar plate containing the following sterile medium:

|   | Grams |
|---|---|
| Tryptone | 0.5 |
| Molasses | 1.0 |
| Glycerol | 1.0 |
| Yeast extract | 0.25 |
| Agar | 2.0 |

Distilled water to make 100 milliliters.

By cross-streaking with various microorganisms, the results revealed that a material was produced which was active against *Staphylococcus aureus, Mycobacterium phlei, Klebsiella pneumoniae, Salmonella schottmuelleri, Proteus vulgaris, Erwinia carotovora, Agrobacter tumefaciens, Streptococcus fecalis, Diplococcus pneumoniae,* and *Shigella sonnei.*

EXAMPLE 2

On a sterile maltose-tryptone agar slant of the following composition:

|   | Grams |
|---|---|
| Maltose | 1 |
| Tryptone | 0.5 |
| $K_2HPO_4$ | 0.05 |
| $FeSO_4 \cdot 7H_2O$ | 0.01 |
| Agar | 1.5 |

Distilled water to make 100 milliliters.

*Streptomyces achromogenes* var. *streptozoticus* was grown for seven days at twenty-eight degrees centigrade. The culture thus produced was used as an inoculum for the following sterile medium:

| | Grams |
|---|---|
| Glucose | 2 |
| Soya flour | 1 |
| Yeast | 0.25 |
| NaCl | 0.3 |
| (NH$_4$)$_2$SO$_4$ | 0.5 |
| Distilled water to make 100 milliliters. | |

The inoculated medium was incubated in shake flasks at 28 degrees centigrade for four days on a rotary shaker. The clear filtrate, Preparation 2, was active against *Bacillus subtilis, Staphylococcus aureus, Escherichia coli, Salmonella schottmuelleri, Proteus vulgaris, Erwinia carotovora, Penicillium oxalicum*, and *Candida albicans*. A papergram of the clear filtrate was run in six solvent systems to identify the antibiotic. The papergram is shown in FIGURE 3.

EXAMPLE 3

A maltose-tryptone agar slant of *Streptomyces achromogenes* var. *streptozoticus* according to Example 2 was used as inoculum for the following sterile medium:

| | Grams |
|---|---|
| Glucose | 1 |
| Beef extract | 1 |
| Bacto peptone (Difco) | 0.5 |
| NaCl | 0.5 |
| Distilled water to make 100 milliliters, | | which was adjusted to pH 7.0 before sterilization. The inoculated medium was incubated in shake flasks for three days at 28 degrees centigrade on a reciprocating shaker and 75 milliliters of the resulting growth was used to inoculate 12 liters of sterile medium of the same formulation. The medium was incubated in a 20 liter stainless steel bottle, at 28 degrees centigrade for two days, the contents being stirred continuously with sparged air at the rate of six liters of free air per minute. The resulting growth was used to inoculate 250 liters of the following sterile medium:

| | Grams |
|---|---|
| Bacto peptone (Difco) | 2 |
| Blackstrap molasses | 2.5 |
| Glucose | 2 |
| NaCl | 0.25 |
| Distilled water to make 100 milliliters, | | which was adjusted to pH 7.0 before sterilization. This medium was incubated in a 100 gallon stainless steel fermentor, at 24 degrees centigrade with sparged air being introduced at the rate of fifty liters per minute and with agitation by an impeller. After 66 hours of fermentation the beer was harvested. To 100 gallons of harvested beer was added 17 pounds of adiatomite, and 35 pounds of activated carbon. The mixture was stirred well and then filtered, the cake was water-washed with ten gallons of tap water, and then washed with 25 gallons of acetone followed by thirty gallons of 1:1 aqueous acetone. The acetone solutions of streptozotocin were pooled and dried in vacuo to 3.88 pounds, Preparation 3, which was active against microorganisms as disclosed supra.

EXAMPLE 4

Spores of *Streptomyces achromogenes* var. *streptozoticus* from a maltose-tryptone agar slant (Example 2) as a 0.5 milliliter sterile water suspension were used to inoculate one gram of sterile soil. The soil mixture was dried at room temperature. An aliquot of 0.25 grams of such soil was used to inoculate 100 milliliters of the following sterile medium in a 500 milliliter Erlenmeyer flask:

| | Grams |
|---|---|
| Glucose | 1 |
| N-Z-amine B [1] | 1 |
| Yeastolac [1] | 1.5 |
| Distilled water to make 100 milliliters. | |

[1] N-Z-amine B is Sheffield's enzymatic digest of casein and Yeastolac is a protein hydrolyzate of yeast cells.

This medium was incubated in shake flasks on a reciprocating shaker at 28 degrees centigrade for 24 hours and was then used to inoculate 20 liters of the following sterile medium:

| | Grams |
|---|---|
| Wilson's peptone liquor [1] | 1 |
| Corn steep liquor | 1 |
| Cottonseed meal | 0.2 |
| Glucose | 1 |
| Distilled water to make 100 milliliters. | |

[1] Wilson's peptone liquor is a hydrolyzed animal stick liquor.

The inoculated medium was incubated in a 7.5 gallon stirred fermentor for 21 hours at 28 degrees centigrade and aerated with sparged air at ten liters of free air per minute. The twenty liters of fermented material was used to inoculate 250 liters of the following sterile medium:

| | Grams |
|---|---|
| Yellow corn meal | 4 |
| N-Z-amine B | 0.5 |
| Distilled water to make 100 milliliters, | | which was adjusted to pH 7.2 before sterilization. The inoculated medium was incubated in a 100 gallon stainless steel fermentor at 37 degrees centigrade for 66 hours and then at 28 degrees centigrade until the time of harvest. A continuous feed of glucose as fifty percent, weight per volume, aqueous solution was begun at the 26th hour at the rate of 100 milliliters of solution per hour up to the 71st hour, and from then on at the rate of 107 milliliters per hour until the 143rd hour at which time the fermentor was harvested. The whole beer was adjusted to pH 4.0 using sulfuric acid and then filtered through diatomite. The cake was washed lightly with tap water. The filtered beer was concentrated in vacuo at less than fifty degrees centigrade to 0.08 volumes or twenty liters, and then added slowly to 100 liters of acetone. Twenty kilograms of diatomite was added to form a slurry. The slurry was filtered and the cake washed with five liters of acetone. The combined acetone filtrate and wash was concentrated to an aqueous solution and freeze-dried, to yield 150 grams of crude streptozotocin, Preparation 4A. A ten gram aliquot of Preparation 4A was dissolved in 800 milliliters of the mixed solvent system consisting of 1-butanol and 0.004 normal hydrochloric acid in water, in the volume proportions 1:1. After 500 transfers in a Craig countercurrent distribution machine there was recovered, at a peak of K=0.256, a bioactive portion which on drying yielded two grams of purified streptozotocin, Preparation 4B.

Preparation 4B was suspended in ten milliliters of distilled water and filtered. The filtrate was extracted four times with separate portions of 100 milliliters of 1-butanol saturated with water. The combined butanol extracts were washed with a total of 45 milliliters of water. The butanol extracts were azeotroped below forty degrees centigrade to an aqueous solution and freeze-dried to yield 1.5 grams of purified streptozotocin, Preparation 4C.

Preparation 4C was further purified by partition chromatography, using the solvent system 1-butanol, cyclohexane, pH 4.0 buffered water in the volume proportions 20:4:4. The solvent system was mixed and separated into an upper and a lower phase. The column was charged with a mixture obtained by slurrying 150 grams of diatomite in 1000 milliliters of upper phase, slowly adding with agitation 60 milliliters of lower phase. The mixture was poured into a one inch column and packed to a constant height of 40 inches with compressed air. Preparation 4C was dissolved in three milliliters of lower phase and mixed with three grams of diatomite and a minimum of upper phase, for stirring and removal of gas, and placed on top of the packed column and then developed with upper phase at the rate of one milliliter per minute. The effluent was separated in twenty milliliter aliquots as it came off the column. The first bioactive aliquot was after 1050 milliliters of eluate. The active aliquots were pooled and then concentrated in vacuo at less than fifty degrees centigrade from five liters of eluate to fifty milliliters of concentrate. The fifty milliliter aqueous concentrate was extracted with five milliliters of 1-butanol. The butanol extract was washed with five milliliters of water. The aqueous phases were pooled and freeze-dried to yield 1.4 grams of purified streptozotocin, Preparation 4D. Preparation 4D was dissolved in ten milliliters of a methylethyl ketone-water solution, in the volume proportions 1:1 and filtered. The solution was concentrated by azeotropic distillation, below 35 degrees centigrade. After an addition of methylethyl ketone, crystals of streptozotocin formed. After being refrigerated, filtered, and vacuum dried, 0.9 gram of crystalline streptozotocin, Preparation 4E was recovered. The crystals were further purified by recrystallizing three times from 95 percent ethanol. The purified crystalline material, Preparation 4F, had the characteristics as given supra in the specifications.

EXAMPLE 5

10,000 oral tablets, each containing 500 milligrams of streptozotocin, were prepared from the following types and amounts of materials:

| | Grams |
|---|---|
| (1) Streptozotocin, feather-type crystals | 5000 |
| (2) Lactose | 1500 |
| (3) Corn starch | 250 |
| (4) Talc | 100 |
| (5) Magnesium stearate | 50 |

The finely powdered materials 1, 2, and 3, were mixed thoroughly, slugged, and then granulated; the granules were mixed with 4 and 5 and tableted. The tablets were also made using prism-type crystals of the same amount with the same results.

EXAMPLE 6

10,000 oral tablets each containing 250 milligrams of streptozotocin were prepared from the following types and amounts of materials:

| | Grams |
|---|---|
| (1) Streptozotocin | 2500 |
| (2) Lactose | 1250 |
| (3) Corn starch | 750 |
| (4) Corn starch (as 10 percent paste) | 200 |
| (5) Calcium stearate | 50 |
| (6) Dried corn starch | 150 |
| (7) Talc | 100 |

The finely powdered materials 1, 2, and 3 were mixed and then granulated with 4; the dried granules were mixed with 5, 6, and 7 and tableted.

EXAMPLE 7

Two-piece hard gelatin capsules for oral use, each containing 250 milligrams of streptozotocin, prism-type crystals, and 125 milligrams of tetracycline hydrochloride, were prepared in the conventional manner by first mixing the finely powdered active materials with excipients (talc, corn starch, light mineral oil and magnesium stearate) and then capsulating. Feather-type crystals were used in the same amount.

In general, about one to two parts by weight of streptozotocin should be present in these compositions for each part of a tetracycline antibiotic. A higher or lower proportion of streptozotocin is found useful in some cases. In each unit dose, the amount of streptozotocin may vary from about 35 milligrams to about one gram depending on the age, weight and condition of the animal. By "a tetracycline antibiotic" we include tetracycline, chlorotetracycline, and oxytetracycline in the form of the amphoteric substance or any one or combinations of the various salts and derivatives which are active, such as the hydrochloride, phosphate, metallic salt complexes, and metallic salts including the sodium or calcium salts.

EXAMPLE 8

Using the formula and procedure described in Example 7, except for the substitution of the tetracycline hydrochloride by potassium penicillin V, capsules were prepared, each containing 250 milligrams of streptozotocin and 250,000 units of penicillin.

In general, about one to two parts by weight of streptozotocin should be present in these compositions for each part of penicillin V, although a higher or lower proportion of streptozotocin can be used. Other penicillins can be used in place of the potassium penicillin V in the above formulation including penicillin G, penicillin O, and other salts of penicillin such as the procaine, N,N - dibenzylethylenediamine, sodium Hydrabamine (New and Nonofficial Drugs, 1958, page 99), and like salts.

EXAMPLE 9

Powder mixtures for oral use, containing in each gram of powder 500 milligrams of triple sulfa (equal parts of sulfamethazine, sulfadiazine and sulfamerazine) and 500 milligrams of streptozotocin were prepared in the conventional manner by first mixing the finely powdered active materials with excipients (magnesium trisilicate, corn starch, light mineral oil and calcium stearate).

EXAMPLE 10

As in Example 9, powder mixtures for oral use, containing in each dose of powder, 250 milligrams of sulfamethylthiadiazole and 150 milligrams of streptozotocin were prepared.

EXAMPLE 11

As in Example 7, except for the substitution of the tetracycline by novobiocin, capsules were prepared each containing 250 milligrams of streptozotocin and 125 milligrams of mono-sodium novobiocin.

In general, about one to two parts by weight of streptozotocin should be present in these compositions for each part of novobiocin. A higher or lower proportion of streptozotocin can be used, however. In each unit dose, the amount of streptozotocin can vary from about 35 milligrams to about one gram depending on the age, weight, and condition of the animal. By "novobiocin" is meant not only novobiocin itself, but also various salts and active derivatives such as the mono-sodium, di-sodium, mono-calcium, di-calcium, mono-magnesium, di-magnesium or other alkali metal or alkaline earth metal salts or amine salts of novobiocin, and dihydronovobiocin and its salts.

EXAMPLE 12

A liquid suspension for oral use, containing in each cubic centimeter 100 milligrams of streptozotocin, was prepared from the following types and amounts of materials:

| | Grams |
|---|---|
| Saccharin sodium | 0.30 |
| Cyclamate sodium (N.N.R.) | 2.0 |
| Powdered sucrose | 25.0 |
| Streptozotocin | 10.0 |
| Benzoic acid powder | 0.10 |
| Methylparaben | 0.10 |
| Butylated hydroxyanisole | 0.01 |
| Orange flavor | 0.25 |
| Aluminum monostearate-peanut oil gel, q.s. to 100 cc. | |

The aluminum monostearate-peanut oil gel was prepared by adding two grams of the stearate powder to 100 cubic centimeters of the oil with stirring and heating to 115 degrees centigrade until a clear gel forms and then cooling to room temperature. To a portion of this gel the preservatives and antioxidant were added with stirring. The antibiotic was then added followed by the sweetening and flavoring agents. When thoroughly mixed, additional oil was added to bring the suspension to 100 cubic centimeters and the preparation was finished by passing it through a colloid mill.

EXAMPLE 13

Using the formula and procedure described in Example 12, except for the addition of ten grams of erythromycin, a liquid suspension for oral use was prepared containing in each cubic centimeter 100 milligrams of streptozotocin and 100 milligrams of erythromycin.

In general, about one to two parts by weight of streptozotocin should be present in these compositions for each part of erythromycin. A higher or lower proportion of streptozotocin, however, can be used. By "erythromycin" is meant not only erythromycin itself, but also various salts and esters such as the lactate, glucoheptonate, stearate, and lactobionate salts, and the ethyl carbonate, maleate, and glutarate esters.

EXAMPLE 14

A sterile aqueous preparation, suitable for intramuscular injection and containing in each cubic centimeter 500 milligrams of streptozotocin, feather or prism-type crystals may be used, was prepared from the following types and amounts of materials:

| | Grams |
|---|---|
| Polyethylene Glycol 4000, U.S.P. | 3.0 |
| Sodium chloride | 0.9 |
| Polysorbate 80, U.S.P. | 0.4 |
| Methylparaben, U.S.P. | 0.18 |
| Propylparaben, U.S.P. | 0.02 |
| Streptozotocin | 50.0 |

Water for injection, q.s. 100 cc.

All of the ingredients, with the exception of the antibiotic, were added to sufficient water for injection with stirring and moderate heat; after dispersion the vehicle was adjusted to about pH 4–5 with suitable buffers and sterilized by filtration. The antibiotic was sterilized by exposure to ethylene vapors and then incorporated into the previously sterilized vehicle. Sterile water for injection was added to bring volume to 100 cubic centimeters. The suspension was finished by passage through a sterile colloid mill.

EXAMPLE 15

Using the formula and procedure described in Example 14 except for the addition of 48 grams of streptomycin sulfate and 0.5 gram of monothioglycerol and 0.25 gram of sodium bisulfite as a stabilizer, a sterile aqueous preparation suitable for intramuscular injection was prepared containing in each cubic centimeter 480 milligrams of streptomycin sulfate and 500 milligrams of streptozotocin. The streptomycin sulfate was dissolved in the vehicle after the pH was adjusted to about 4–5 and sterilized by filtration. The stabilizer was added before adding the streptomycin. Suitable stabilizers include 0.5 to 1.5 percent of monothioglycerol, monothiosorbitol, monothioglucose, $\beta,\beta'$-thiodipropionic acid or one of its water-soluble esters, salts of sulfurous and hydrosulfurous acids and aldehyde addition products thereof such as sodium bisulfite, sodium formaldehyde sulfoxylate, potassium metabisulfite, and sodium hydrosulfite. Advantageously a combination of organic and inorganic stabilizers is used, such as 0.2 to 0.7 percent of monothioglycerol with about 0.25 to 0.75 percent of sodium bisulfite. Half the streptomycin sulfate can be replaced by an equivalent amount of dihydrostreptomycin sulfate.

EXAMPLE 16

Twenty kilograms of an ointment was prepared in the following types and amounts of materials:

| | Grams |
|---|---|
| Streptozotocin | 500 |
| White mineral oil, U.S.P. | 5000 |
| Wool fat, U.S.P. | 4000 |

White petrolatum, q.s. to 20,000 grams.

The antibiotic material was mixed with the mineral oil and the resulting slurry was milled. The remaining ingredients were melted, strained, and adjusted to fifty to 55 degrees centigrade and then added to the slurry, mixing thoroughly and continuously until the temperature of the mixture dropped to about 32 degrees centigrade. The resulting preparation is suitable for topical, including ophthalmic, use.

Using the above procedure, except for the substitution of derivatives of streptozotocin such as the acetate, or the hydrogenated form of streptozotocin the corresponding ointments are obtained.

Using the above procedure, ointments can be prepared containing ten to 100 milligrams of streptozotocin per gram of ointment in advantageous combination with other therapeutic materials such as hydrocortisone (five to 25 milligrams) including esters and water-soluble derivatives of hydrocortisone such as hydrocortisone acetate (five to 25 milligrams); sodium succinate salt of hydrocortisone (five to 25 milligrams); sodium dimethylglutarate (five to 25 milligrams), or the like; or the equivalent amounts of prednisone, prednisolone, 6α-methylprednisolone, 6α-fluoroprednisolone, 16-methylprednisolone, 4α-fluoro-16-hydroxyhydrocortisone, 21-desoxy-9α-fluoro-6α-methylprednisolone, or the corresponding derivatives; bacitracin (100 to 1000 units), polymyxin sulfate (2500 to 10,000 units), and neomycin or an acid salt of neomycin (2.5 to ten milligrams) or mixtures thereof.

EXAMPLE 17

A 250 milligram aliquot of streptozotocin, Preparation 4F, was dissolved in five milliliters of acetic anhydride, five milliliters of anhydrous pyridine was added, and the combination was mixed well and allowed to stand at room temperature overnight. The pyridine and excess acetic anhydride were removed under reduced pressures leaving a residue of 280 milligrams, Preparation 17A, of acetylated streptozotocin. In the place of acetic anhydride, other acylating agents that were used are, propionic anhydride, propionic chloride, benzoyl chloride, and acetyl chloride to produce the corresponding ester.

EXAMPLE 18

An aliquot of 10.39 milligrams of streptozotocin, Preparation 4F, was dissolved in two milliliters of acetic acid and ten milligrams of platinum oxide were added. The mixture was hydrogenated under atmospheric pressure for thirty minutes. The streptozotocin took up approximately 5.43 moles of hydrogen per mole of sample, assuming a molecular weight of 470 for streptozotocin. The catalyst was filtered off, and the solvent, acetic acid, was removed under reduced pressures. There was recovered 10.2 milligrams, Preparation 18A, of hydrogenated streptozotocin. Hydrogenation was also accomplished using palladium on charcoal, as the catalyst, in ethanol. In this instance about two moles of hydrogen are taken up per mole of sample.

EXAMPLE 19

A whole fermented beer of 250 liters, as produced in Example 4, of pH 6.2 was adjusted to pH 4.2 with sulfuric acid and then filtered using four percent, 22 pounds, diatomite as a filter aid. The filter cake was washed twice with one gallon each wash of tap water. The clear beer and water-washes were combined and held overnight under refrigeration. The combined beer, filtered beer, and washes were treated with four percent, 22 pounds, of activated carbon and one percent, five pounds, of diatomite. The mixture was slurried for one-half hour and filtered. The cake was washed twice with tap water, two gallons being used. The carbon cake was eluted once with 80 liters of 3A ethanol. 3A ethanol is a denatured mixture containing five gallons of absolute methanol in 100 gallons of 190 proof ethanol; that is, five percent methanol, five percent water, and 90 percent ethanol. The cake was then washed twice with 18 liters each of 3A ethanol. The ethanol eluates were pooled and concentrated to an aqueous solution at temperatures below 45 degrees centigrade and then freeze-dried. This yielded 400 grams of purified streptozotocin, Preparation 19A, which on further purification by partition chromatography by the procedure applied to 4C in Example 4 yielded preparations similar to Preparations 4D, E, and F.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. A novel composition of matter active against *Pasteurella multocida, Salmonella pullorum, Salmonella schottmuelleri, Staphylococcus aureus,* and *Proteus vulgaris* which in its pure crystalline form has an infrared spectrum which exhibits characteristic absorption bands expressed in reciprocal centimeters at the following frequencies: 3400, 3230, 1708–1710, 1498, 1415–1420, 1325, 1290–1295, 1250–1255, 1040–1042, 1227–1230, 1170–1173, 1140, 995, 917–918, 872, 865, 800, 780, 725, 690; has a characteristic papergram pattern as shown in FIGURE 3: has a maximum in the ultraviolet spectrum at 228 millimicrons; consists of the elements carbon, hydrogen, nitrogen, and oxygen in the molecular proportions of $C_{14}H_{27}N_5O_{12}$; is optically active; and is soluble in water, lower alkanones and lower alkanols.

2. Streptozotocin according to claim 1 in its pure crystalline form.

3. Crystalline streptozotocin according to claim 2 characterized by a feather-type crystalline form; by an optical rotation $[\alpha]_D^{25} = +87° \pm 10°$ C., 1% ethanol; and by a rotatory dispersion curve as shown in FIGURE 4.

4. Crystalline streptozotocin according to claim 2 characterized by a prism-type crystalline form; by an optical rotation $[\alpha]_D^{25} = +68° \pm 10°$ C., 1% ethanol; and by a rotatory dispersion curve as shown in FIGURE 4.

5. A process for obtaining streptozotocin according to claim 4 which comprises cultivating *Streptomyces achromogenes* var. *streptozoticus* in an aqueous nutrient medium under aerobic conditions until substantial antibiotic activity is imparted to said medium by production of streptozotocin and isolating streptozotocin from the culture medium.

6. A process for obtaining streptozotocin according to claim 4 which comprises cultivating under aerobic conditions *Streptomyces achromogenes* var. *streptozoticus* in an aqueous nutrient medium containing assimilable carbohydrate and nitrogenous material at a temperature between about 25 degrees centigrade and about 37 degrees centigrade for a period between about two and about ten days, and then recovering streptozotocin therefrom.

7. A process for obtaining streptozotocin according to claim 4 which comprises cultivating under aerobic conditions *Streptomyces achromogenes* var. *streptozoticus* in an aqueous nutrient medium containing assimilable carbohydrate and nitrogenous material at a temperature between about 25 degrees centigrade to about 37 degrees centigrade for a period between about two and about ten days until substantial antibiotic activity is imparted to said medium by production of streptozotocin, separating the streptozotocin from the culture medium, and isolating the streptozotocin therefrom.

8. The process for recovering streptozotocin according to claim 6 in which the isolation is effected by adsorbing the streptozotocin on material taken from the group consisting of activated carbon, bentonite, diatomite, and fuller's earth, eluting the streptozotocin therefrom with a solvent selected from the class consisting of lower fatty acid esters, lower alkanones, and lower alkanols, and recovering the streptozotocin therefrom.

9. The process for recovering streptozotocin according to claim 6 in which the isolation is effected by adsorbing the streptozotocin on material taken from the group consisting of activated carbon, bentonite, diatomite, and fuller's earth, eluting the streptozotocin therefrom with a solvent selected from the class consisting of lower fatty acid esters, lower alkanones, and lower alkanols, and crystallizing the streptozotocin therefrom.

References Cited in the file of this patent

Pridham et al.: Antibiotics Annual, 1956–1957, pp. 947–953.

Biological Abstracts, January 1954, page 149, paragraph 1446.